(12) United States Patent
Takahashi

(10) Patent No.: US 8,536,843 B2
(45) Date of Patent: Sep. 17, 2013

(54) POWER SUPPLY CIRCUIT

(75) Inventor: Yukio Takahashi, Kiryu (JP)

(73) Assignee: ON Semiconductor Trading, Ltd., Hamilton (BM)

( * ) Notice: Subject to any disclaimer, the term of this patent is extended or adjusted under 35 U.S.C. 154(b) by 364 days.

(21) Appl. No.: 13/109,113

(22) Filed: May 17, 2011

(65) Prior Publication Data

US 2011/0291631 A1 Dec. 1, 2011

(30) Foreign Application Priority Data

May 25, 2010 (JP) ................................ 2010-119503

(51) Int. Cl.
*G05F 1/00* (2006.01)

(52) U.S. Cl.
USPC ............... 323/272; 323/207; 363/65; 363/89; 363/90

(58) Field of Classification Search
USPC ..................... 323/207, 222, 272; 363/65, 69, 363/70, 89, 90
See application file for complete search history.

(56) References Cited

U.S. PATENT DOCUMENTS 5,321,598 A * 6/1994 Moran ............................. 363/41
2007/0103949 A1* 5/2007 Tsuruya ........................ 363/125

FOREIGN PATENT DOCUMENTS

JP 2006-25579 1/2006

* cited by examiner

*Primary Examiner* — Nguyen Tran
*Assistant Examiner* — Afework Demisse
(74) *Attorney, Agent, or Firm* — Morrison & Foerster LLP

(57) ABSTRACT

This invention offers a power supply circuit that is capable of improving a power factor as well as reducing a ripple current of an input/output of the power supply circuit due to switching of a switching device. The power supply circuit is provided with a first power supply circuit including first and second switching devices, a second power supply circuit including third and fourth switching devices and a switching control circuit. The switching control circuit controls the switching devices so that the first switching device and the third switching device are turned on and off at timings different from each other when an alternating current voltage from an alternating current power supply is positive, and the second switching device and the fourth switching device are turned on and off at timings different from each other when the alternating current voltage is negative.

4 Claims, 13 Drawing Sheets

POWER SUPPLY CIRCUIT

CROSS-REFERENCE OF THE INVENTION

This application claims priority from Japanese Patent Application No. 2010-119503, the content of which is incorporated herein by reference in its entirety.

BACKGROUND OF THE INVENTION

1. Field of the Invention

This invention relates to a power supply circuit converting an alternating current voltage into a direct current voltage.

2. Description of the Related Art

A power supply circuit having a rectifier circuit (a diode bridge circuit, for example) and a smoothing circuit (a capacitor, for example) and converting an alternating current voltage into a direct current voltage is known as a power supply circuit for various kinds of electronic equipment. However, such a power supply circuit has a poor power factor when an alternating current voltage of a sine wave is applied, because an electric current flows through the power supply circuit only around a peak of the sine wave. Also, in the case where a current not proportional to the sine wave flows although the alternating current voltage of the sine wave is applied, higher harmonics are caused to exert an adverse effect on peripheral equipment in some cases.

Thus, there is proposed a power supply circuit which improves the power factor, suppresses the higher harmonics, and regulates the direct current voltage by connecting a switching device in parallel to the diode and switching the switching device at an appropriate timing to make the current flowing through the power supply circuit similar in shape to the sine wave of the alternating current voltage (Refer to Japanese Patent Application Publication No. 2006-25579, for example.).

FIG. 10 is a block diagram showing a structure of a conventional power supply circuit. The power supply circuit is provided with four diodes D1, D2, D3 and D4, which constitute a diode bridge circuit to full-wave rectify an alternating current voltage, a resistor RX for current detection, switching devices 116 and 117, a drive circuit 124, a switching control circuit 126 and divider resistors R1 and R2 to divide an output voltage.

The alternating current voltage from an alternating current power supply 110 is applied through a reactor 112 to an R line that is an alternating current input line, while the alternating current voltage from the alternating current power supply 110 is directly inputted to an S line that is another alternating current input line. The alternating current voltage applied by the alternating current power supply 110 is full-wave rectified by the diodes D1, D2, D3 and D4, before being smoothed by a capacitor 123 connected between a P-side electrode and an N-side electrode.

The switching device 116 is connected in series with the resistor RX. The serially-connected switching device 116 and the resistor RX are connected in parallel with the diode D1. The switching device 116 and the diode D1 are connected in reverse polarity (directions of the current flow are opposite to each other).

The switching device 117 is connected in series with the resistor RX. The serially-connected switching device 117 and the resistor RX are connected in parallel with the diode D2. The switching device 117 and the diode D2 are connected in reverse polarity (directions of the current flow are opposite to each other). The resistor RX detects a current flowing through either the diode D1 or the diode D2 in a period during which either the switching device 116 or the switching device 117 is turned on.

The divider resistors R1 and R2 are connected in series between the P-side electrode and the N-side electrode, and divide the output voltage generated between the P-side electrode and the N-side electrode. That is, a divided voltage signal of the output voltage is outputted from a connecting node between the divider resistors R1 and R2.

The drive circuit 124 amplifies an input from the switching control circuit 126 to large enough amplitude to drive the switching devices 116 and 117 before outputting it. The switching control circuit 126 controls timings to turn on and off the switching devices 116 and 117 based on results of the current detection by the resistor RX and the divided voltage signal of the output voltage.

Next, operations of the conventional power supply circuit are explained. FIG. 11 shows the operations of the power supply circuit in the case where the alternating current voltage of the alternating current power supply 110 on the R line is positive relative to that on the S line.

<In the Case where the Switching Device 116 is Turned On>

In the case where the alternating current voltage on the R line is positive relative to that on the S line and the switching device 116 is turned on, a current flows through a path indicated by a chain line in FIG. 11, that is, the R line (the reactor 112)→the switching device 116→the resistor RX→the diode D2→the S line. Energy is stored in the reactor 112 during this period.

<In the Case where the Switching Device 116 is Turned Off>

In the case where the alternating current voltage on the R line is positive relative to that on the S line and the switching device 116 is turned off, the reactor 112 works to make a current flow in the same direction as in the case where the switching device 116 is turned on. Therefore, the current flows through a path indicated by a dashed line in FIG. 11, that is, the R line (the reactor 112)→the diode D3→the capacitor 123→the diode D2→the S line, and the capacitor 123 is charged. The energy stored in the reactor 112 is outputted to the capacitor 123 to boost a direct current voltage generated between the P-side electrode and the N-side electrode (hereafter referred to as a direct current output voltage) during this period.

FIG. 12 shows the operations of the power supply circuit in the case where the alternating current voltage of the alternating current power supply 110 on the R line is negative relative to that on the S line.

<In the Case where the Switching Device 117 is Turned On>

In the case where the alternating current voltage on the R line is negative relative to that on the S line and the switching device 117 is turned on, a current flows through a path indicated by a chain line in FIG. 12, that is, the S line→the switching device 117→the resistor RX→the diode D1→the R line (the reactor 112). Energy is stored in the reactor 112 during this period.

<In the Case where the Switching Device 117 is Turned Off>

In the case where the alternating current voltage on the R line is negative relative to that on the S line and the switching device 117 is turned off, the reactor 112 works to make a current flow in the same direction as in the case where the switching device 117 is turned on. Therefore, the current flows through a path indicated by a dashed line in FIG. 12, that is, the S line→the diode D4→the capacitor 123→the diode D1→the R line (the reactor 112), and the capacitor 123 is charged. The energy stored in the reactor 112 is outputted to the capacitor 123 to boost the direct current output voltage during this period.

The power supply circuit is structured so that the current flows through the resistor RX only when either the switching device 116 or the switching device 117 is turned on. The current flowing through the power supply circuit can be made similar in shape to the sine wave of the alternating current voltage to improve the power factor by controlling the timing to switch the switching device 116 or the switching device 117 based on the current flowing through the resistor RX.

However, there is a problem with the conventional power supply circuit that a ripple current of an input/output of the power supply circuit due to the switching of the switching device 116 or the switching device 117 is large.

This invention is directed to offering a power supply circuit that is capable of improving the power factor as well as reducing the ripple current of the input/output of the power supply circuit due to the switching of the switching device.

SUMMARY OF THE INVENTION

A power supply circuit of this invention is provided with a positive-side output terminal, a negative-side output terminal, a first power supply circuit having first and second alternating current input lines between which an alternating current voltage is applied, a first bridge circuit formed of first, second, third and fourth rectifying devices each of which is connected to the first or second alternating current input line and generating an output voltage between the positive-side output terminal and the negative-side output terminal by full-wave rectifying the alternating current voltage, a first switching device connected in parallel with the first rectifying device that is connected with the negative-side output terminal, and a second switching device connected in parallel with the second rectifying device that is connected with the negative-side output terminal, a second power supply circuit having a third alternating current input line connected with the first alternating current input line, a fourth alternating current input line connected with the second alternating current input line, a second bridge circuit formed of fifth, sixth, seventh and eighth rectifying devices each of which is connected to the third or fourth alternating current input line and generating an output voltage between the positive-side output terminal and the negative-side output terminal, a third switching device connected in parallel with the fifth rectifying device that is connected with the negative-side output terminal and a fourth switching device connected in parallel with the sixth rectifying device that is connected with the negative-side output terminal, and a switching control circuit that controls switching timings of the first, second, third and fourth switching devices so that the first switching device and the third switching device are turned on and off at timings different from each other when the alternating current voltage on the first alternating current input line is positive relative to that on the second alternating current input line and the second switching device and the fourth switching device are turned on and off at timings different from each other when the alternating current voltage on the first alternating current input line is negative relative to that on the second alternating current input line.

BRIEF DESCRIPTION OF THE DRAWINGS

FIG. 2 is to explain operations of the power supply circuit in the case where an alternating current voltage on an R line is positive and a first switching device 16 is turned on.

FIG. 4 is to explain operations of the power supply circuit in the case where the alternating current voltage on the R line is positive and a third switching device 18 is turned on.

FIG. 6 is to explain operations of the power supply circuit in the case where the alternating current voltage on the R line is negative and a second switching device 17 is turned on.

FIG. 8 is to explain operations of the power supply circuit in the case where the alternating current voltage on the R line is negative and a fourth switching device 19 is turned on.

DETAILED DESCRIPTION OF THE INVENTION

Overall Structure

Figure 1:
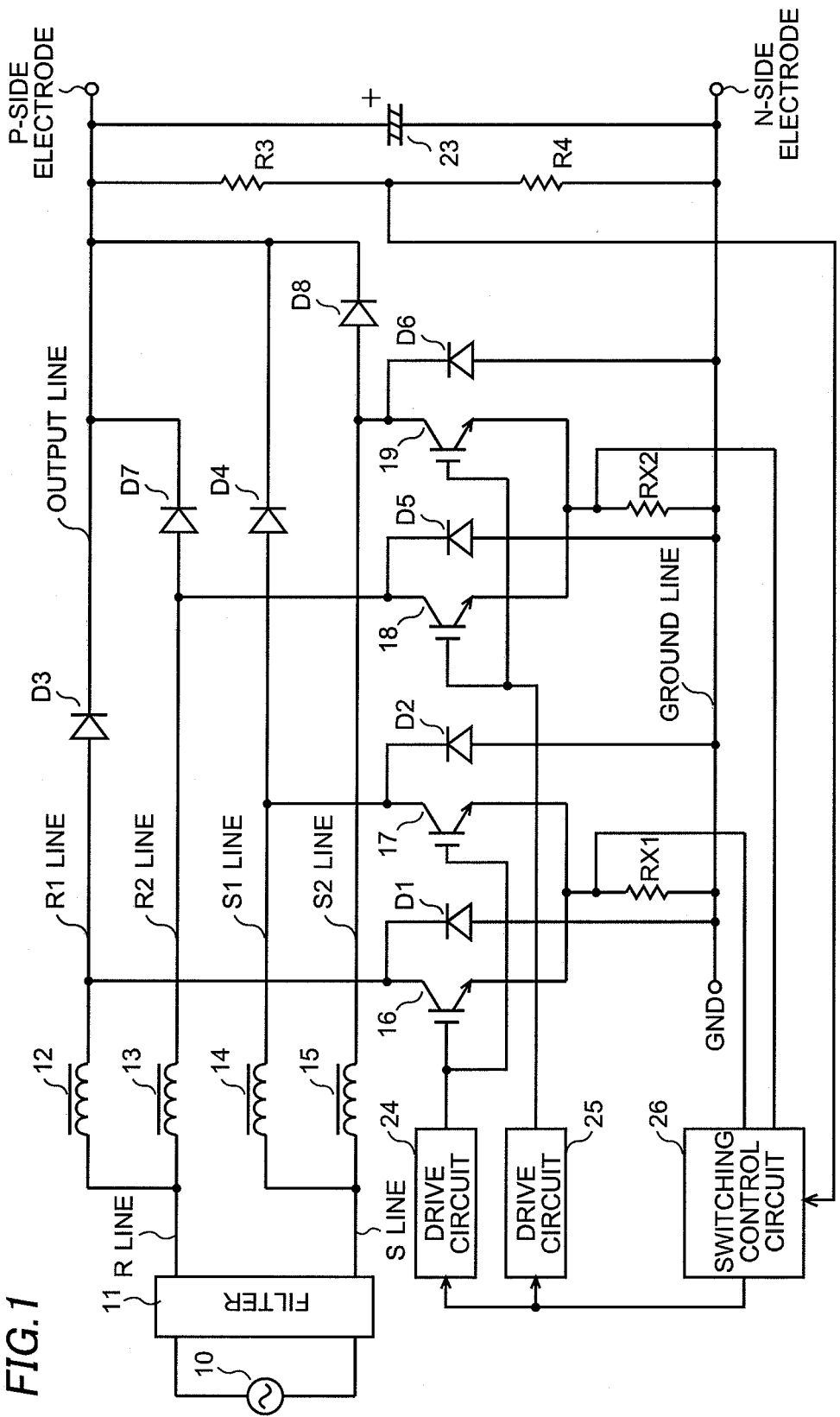
FIG. 1 is a circuit diagram showing a structure of a power supply circuit according to an embodiment of this invention.

FIG. 1 is a circuit diagram showing a structure of a power supply circuit according to an embodiment of this invention. The power supply circuit is basically formed of two conventional power supply circuits (voltage boosting converter circuits) connected in parallel. Switching devices constituting each of the power supply circuits are turned on/off at timings shifted from each other, in other words, it adopts an interleave method in which the switching devices are turned on/off at timings different from each other.

The power supply circuit is provided with a first power supply circuit, a second power supply circuit and a switching control circuit 26. The first power supply circuit is provided with four diodes D1, D2, D3 and D4 which constitute a first diode bridge circuit to full-wave rectify an alternating current voltage, a resistor RX1 for current detection, a first switching device 16, a second switching device 17 and a drive circuit 24.

The second power supply circuit is connected in parallel with the first power supply circuit, and is provided with four diodes D5, D6, D7 and D8 which constitute a second diode bridge circuit to full-wave rectify the alternating current voltage, a resistor RX2 for current detection, a third switching device 18, a fourth switching device 19 and a drive circuit 25. Each of the diodes D1-D8 is an example of a rectifying device.

The alternating current voltage from an alternating current power supply 10 is applied to an R line that is an alternating current input line. The R line is connected to an R1 line (a first alternating current input line) and an R2 line (a third alternating current input line). That is, the R line is branched into the R1 line and the R2 line. The alternating current voltage is applied to the R1 line through a reactor 12, and is applied to the R2 line through a reactor 13.

The alternating current voltage from the alternating current power supply 10 is also applied to an S line that is another alternating current input line. The S line is connected to an S1 line (a second alternating current input line) and an S2 line (a fourth alternating current input line). That is, the S line is branched into the S1 line and the S2 line. The alternating current voltage is applied to the S1 line through a reactor 14, and is applied to the S2 line through a reactor 15. The reactors 12, 13, 14 and 15 are coils such as toroidal coils, for example.

The diode D3 is connected between the R1 line and an output line, the diode D7 is connected between the R2 line and the output line, the diode D4 is connected between the S1 line and the output line, and the diode D8 is connected between the S2 line and the output line. The output line is connected to a P-side electrode (a positive-side output terminal).

The diode D1 is connected between the R1 line and a ground line, the diode D2 is connected between the S1 line and the ground line, the diode D5 is connected between the R2 line and the ground line, and the diode D6 is connected between the S2 line and the ground line. The ground line is connected to an N-side electrode (a negative-side output terminal).

The alternating current voltage applied by the alternating current power supply 10 is full-wave rectified by the first diode bridge circuit composed of the diodes D1, D2, D3 and D4 and the second diode bridge circuit composed of the diodes D5, D6, D7 and D8 before smoothed by a capacitor 23 connected between the P-side electrode and the N-side electrode. In this case, the N-side electrode is grounded, and a positive direct current voltage is generated at the P-side electrode as an output voltage.

The first switching device 16 is connected in series with the resistor RX1. The serially-connected switching device 16 and the resistor RX1 are connected in parallel with the diode D1 between the R1 line and the ground line. The first switching device 16 and the diode D1 are connected in reverse polarity (directions of the current flow are opposite to each other).

The second switching device 17 is connected in series with the resistor RX1. The serially-connected switching device 17 and the resistor RX1 are connected in parallel with the diode D2 between the S1 line and the ground line. The second switching device 17 and the diode D2 are connected in reverse polarity (directions of the current flow are opposite to each other).

The third switching device 18 is connected in series with the resistor RX2. The serially-connected switching device 18 and the resistor RX2 are connected in parallel with the diode D5 between the R2 line and the ground line. The third switching device 18 and the diode D5 are connected in reverse polarity (directions of the current flow are opposite to each other).

The fourth switching device 19 is connected in series with the resistor RX2. The serially-connected switching device 19 and the resistor RX2 are connected in parallel with the diode D6 between the S2 line and the ground line. The fourth switching device 19 and the diode D6 are connected in reverse polarity (directions of the current flow are opposite to each other).

The first through fourth switching devices 16, 17, 18 and 19 are transistors such as insulated gate bipolar transistors (IGBTs).

Divider resistors R3 and R4 are connected in series between the P-side electrode and the N-side electrode to divide the output voltage generated between the P-side electrode and the N-side electrode. That is, the divider resistors R3 and R4 form an output voltage divider circuit, and output a divided voltage signal from a connecting node between them.

The drive circuit 24 amplifies a switching control signal from the switching control circuit 26 to an amplitude large enough to drive the switching devices 16 and 17 before outputting it. The drive circuit 25 amplifies the switching control signal from the switching control circuit 26 to an amplitude large enough to drive the switching devices 18 and 19 before outputting it.

The switching control circuit 26 generates the switching control signal to control timings to turn on and off the switching devices 16, 17, 18 and 19 based on results of current detection by the resistors RX1 and RX2 and the divided voltage signal of the output voltage. When the alternating current voltage from the alternating current power supply 10 is positive, that is, the alternating current voltage on the R line is positive relative to that on the S line, the switching control circuit 26 controls the first switching device 16 and the third switching device 18 so that the first switching device 16 and the third switching device 18 are turned on and off at timings different from each other. That is, while the first and third switching devices 16 and 18 alternate between ON and OFF, they are controlled so that both of them neither switch from an OFF state to an ON state simultaneously, nor switch from the ON state to the OFF state simultaneously. The switching control circuit 26 is a microcomputer for example.

Similarly, when the alternating current voltage from the alternating current power supply 10 is negative, that is, the alternating current voltage on the R line is negative relative to that on the S line, the switching control circuit 26 controls the second switching device 17 and the fourth switching device 19 so that the second switching device 17 and the fourth switching device 19 are turned on and off at timings different from each other.

A filter 11 may be provided in order to remove a ripple of an input/output caused by a switching noise of the switching device 16, 17, 18 or 19. The filter 11 is composed of an LC circuit including a coil and a capacitor, for example, and is connected between the alternating current power supply 10 and the R line and the S line.

===Operations of the Power Supply Circuit===

Next, operations of the power supply circuit according to the embodiment of this invention are explained. FIG. 2-FIG. 5 are to explain the operations of the power supply circuit in the case where the alternating current voltage of the alternating current power supply 10 on the R line (the R1 line, the R2 line) is positive relative to that on the S line (the S1 line, the S2 line). In this case, while the first and third switching devices 16 and 18 alternate between ON and OFF and a current flows through one of them which is turned on, no current flows through the second switching device 17 or the fourth switching device 19 because they are reverse-biased.

<In the Case where the First Switching Device 16 is Turned On>

Figure 2:
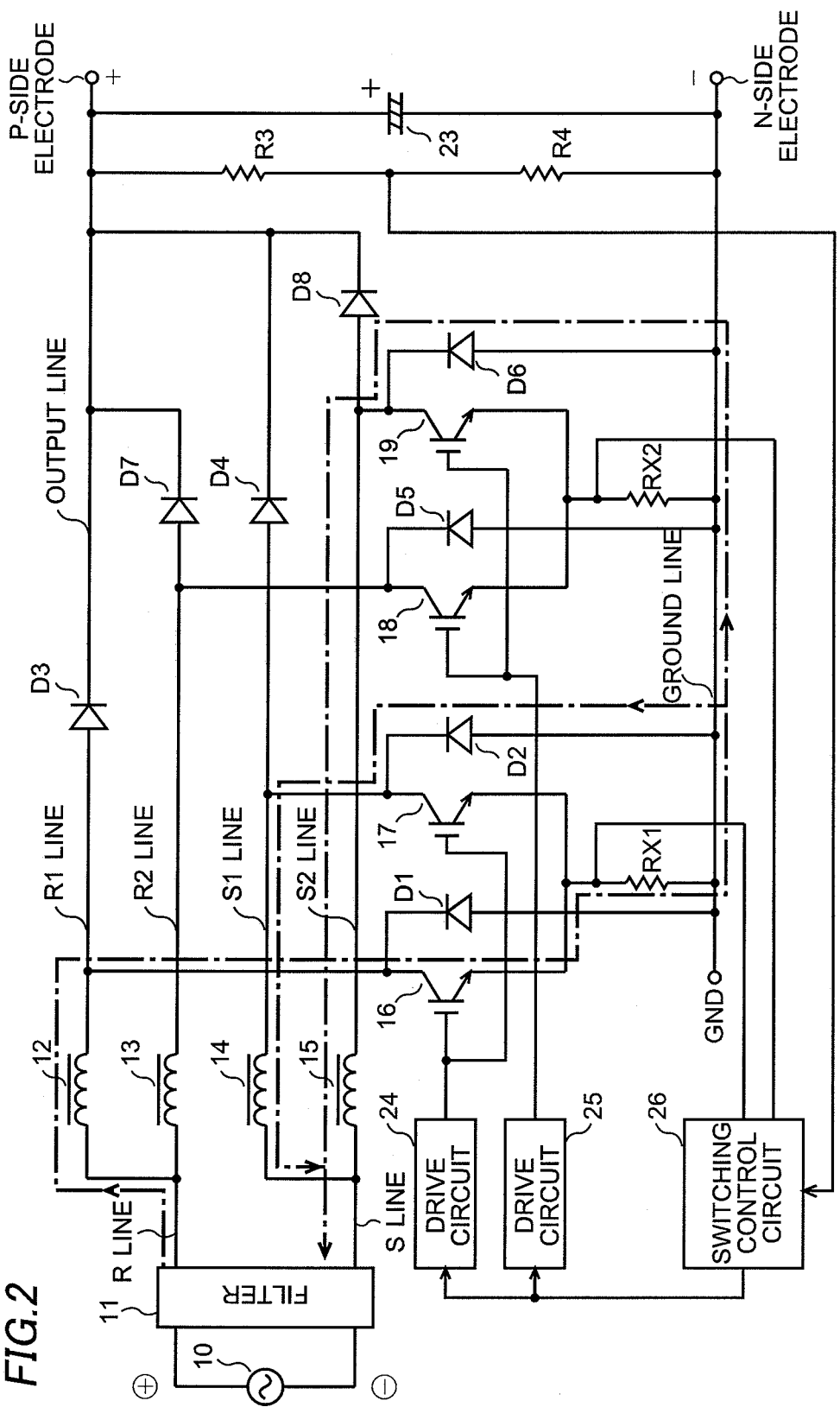
Figure 3:
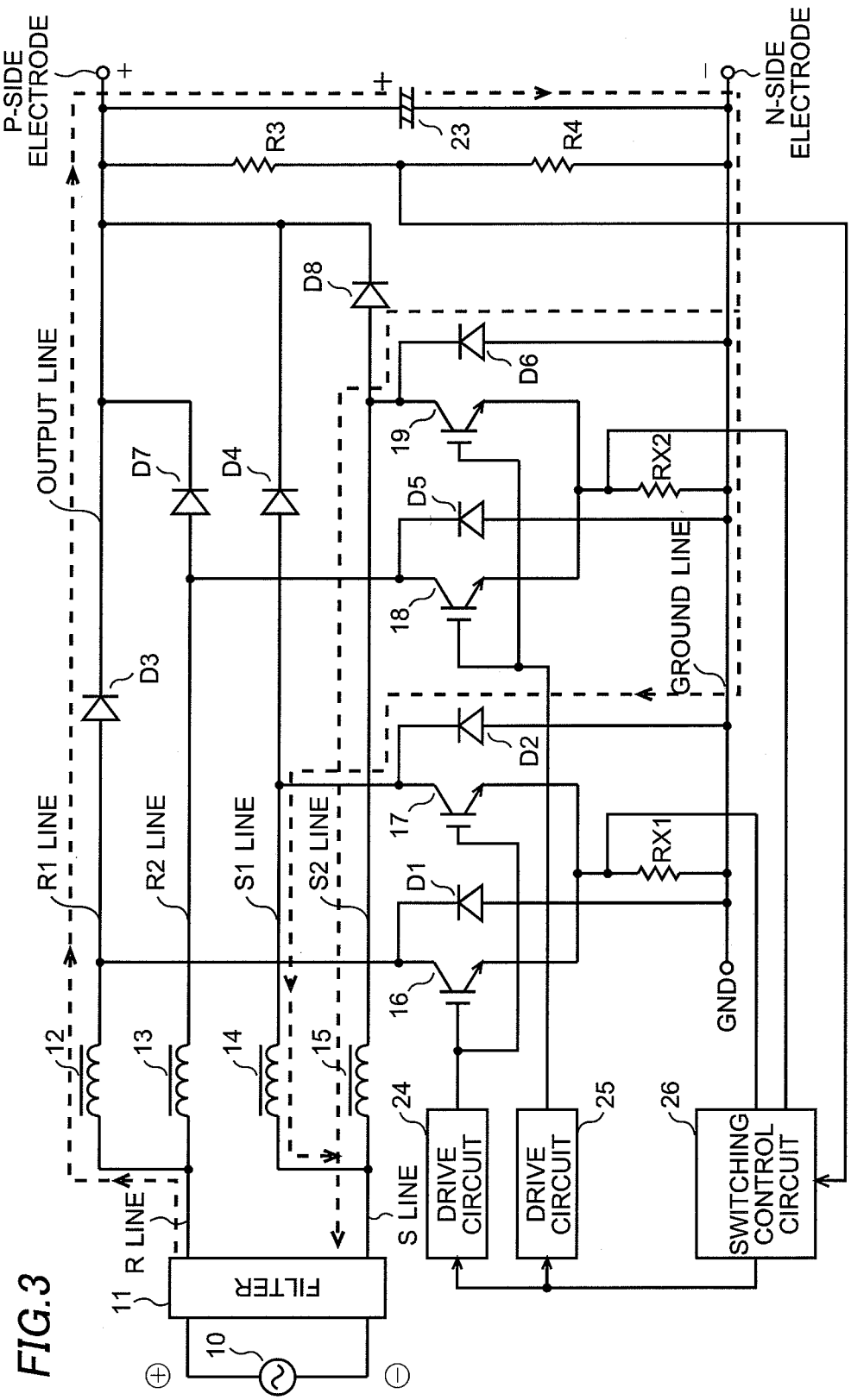
FIG. 3 is to explain operations of the power supply circuit in the case where the alternating current voltage on the R line is positive and the first switching device 16 is turned off.

In the case where the alternating current voltage on the R line is positive relative to that on the S line and the first switching device 16 is turned on, a current flows through two branch paths indicated by chain lines in FIG. 2, which are, the R line→the R1 line (the reactor 12)→the first switching device 16→the resistor RX1→the diode D2→the S1 line (the reactor 14)→the S line, and the R line→the R1 line (the reactor 12)→the first switching device 16→the resistor RX1→the diode D6→the S2 line (the reactor 15)→the S line. In this case, the current returns to the alternating current power supply 10 through the S1 line and the S2 line. Energy is stored in the reactors 12, 14 and 15 during this period.

<In the Case where the First Switching Device 16 is Turned Off>

In the case where the alternating current voltage on the R line is positive relative to that on the S line and the first switching device 16 is turned off, the reactors 12, 14 and 15 work to make a current flow in the same direction as in the case where the first switching device 16 is turned on. Therefore, the current flows through two branch paths indicated by dashed lines in FIG. 3, which are, the R line→the R1 line (the reactor 12)→the diode D3→the capacitor 23→the diode D2→the S1 line (the reactor 14) the S line, and the R line→the R1 line (the reactor 12)→the diode D3→the capacitor 23→the diode D6→the S2 line (the reactor 15)→the S line, and the capacitor 23 is charged. The energy stored in the reactors 12, 14 and 15 is outputted to the capacitor 23 to boost the direct current voltage generated between the P-side electrode and the N-side electrode during this period.

<In the Case where the Third Switching Device 18 is Turned On>

Figure 4:
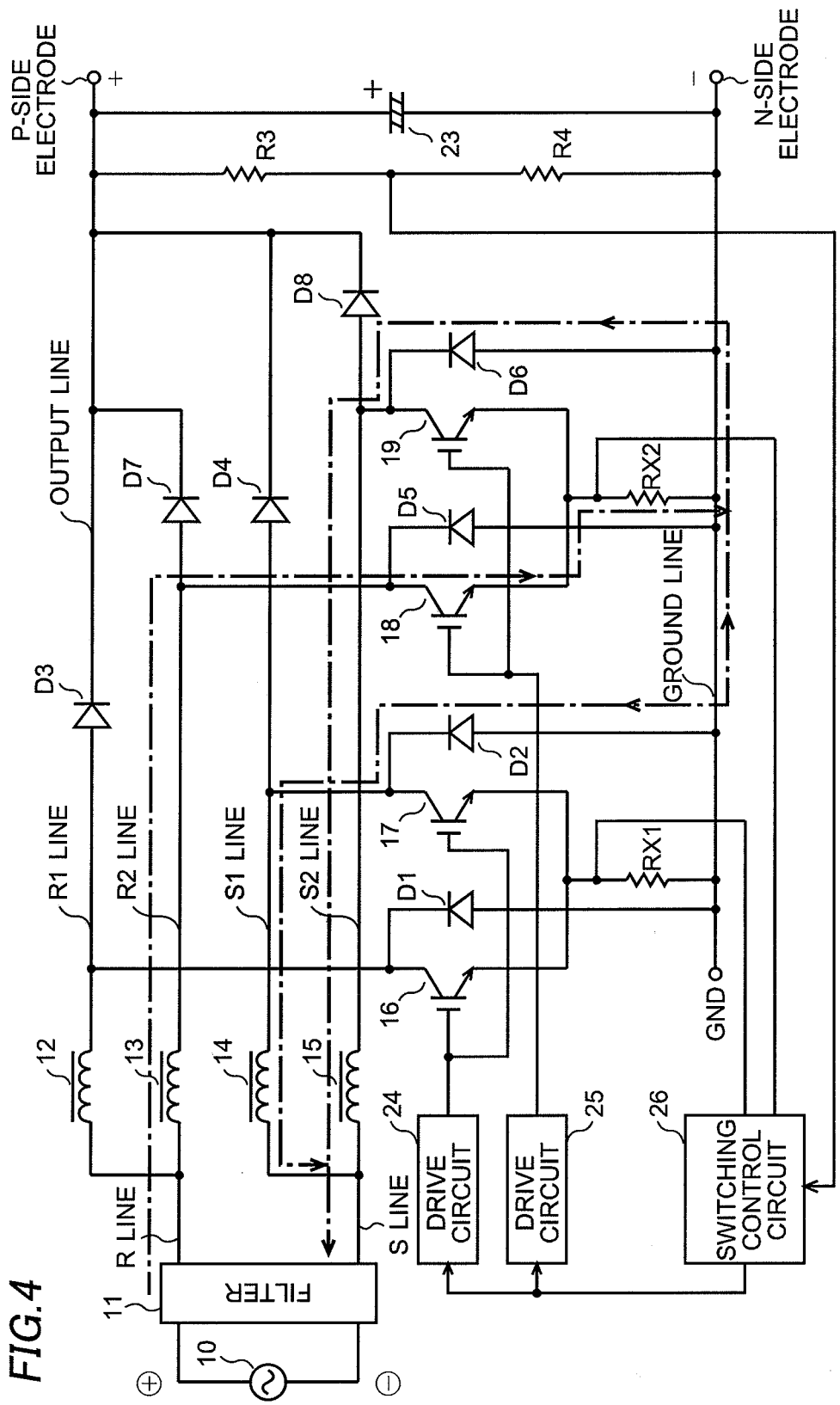
Figure 5:
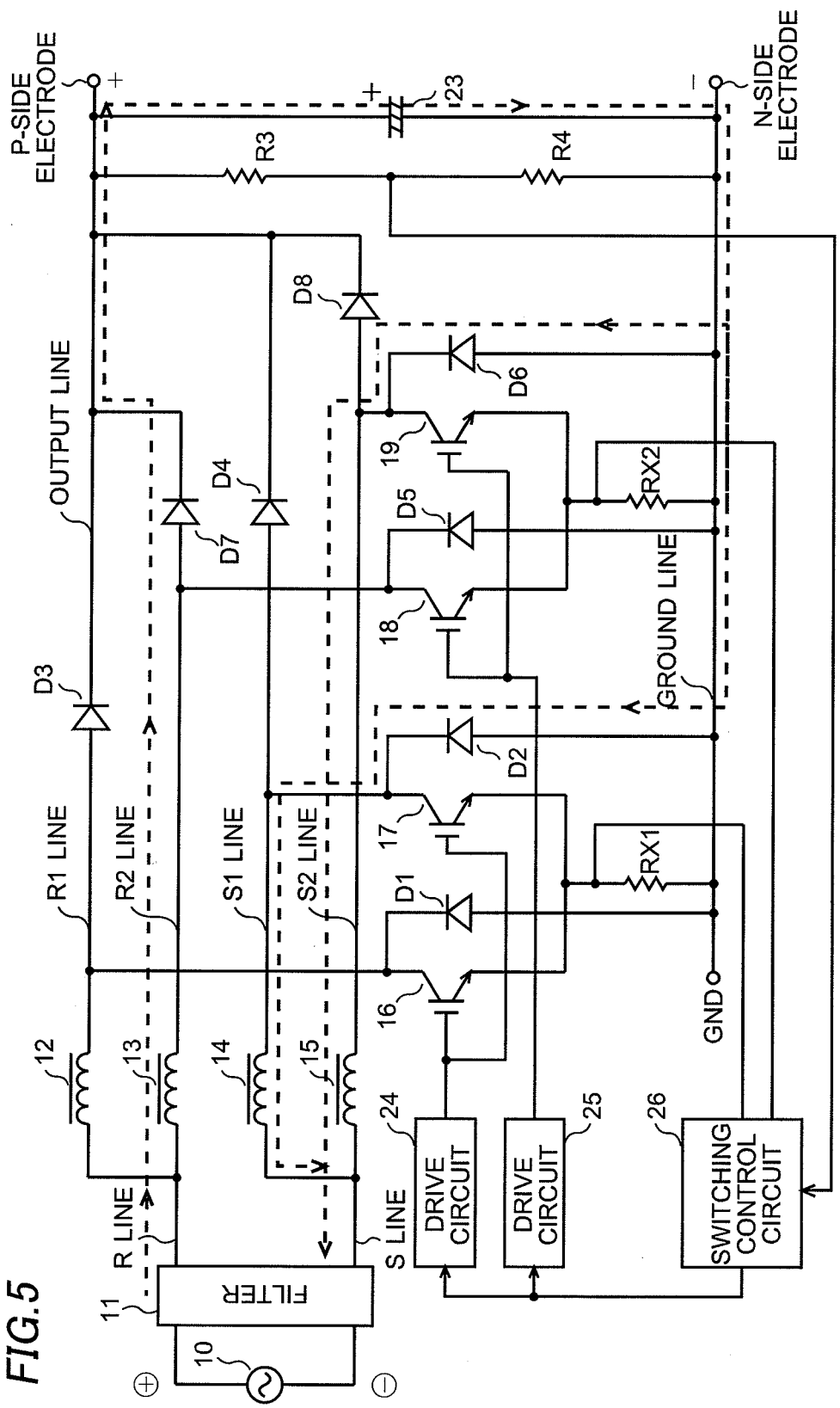
FIG. 5 is to explain operations of the power supply circuit in the case where the alternating current voltage on the R line is positive and the third switching device 18 is turned off.

In the case where the alternating current voltage on the R line is positive relative to that on the S line and the third switching device 18 is turned on, a current flows through two branch paths indicated by chain lines in FIG. 4, which are, the R line the R2 line (the reactor 13)→the third switching device 18→the resistor RX2→the diode D2→the S1 line (the reactor 14)→the S line, and the R line→the R2 line (the reactor 13)→the third switching device 18 the resistor RX2→the diode D6→the S2 line (the reactor 15)→the S line. In this case, the current returns to the alternating current power supply 10 through the S1 line and the S2 line. Energy is stored in the reactors 13, 14 and 15 during this period.

<In the Case where the Third Switching Device 18 is Turned Off>

In the case where the alternating current voltage on the R line is positive relative to that on the S line and the third switching device 18 is turned off, the reactors 13, 14 and 15 work to make a current flow in the same direction as in the case where the third switching device 18 is turned on. Therefore, the current flows through two branch paths indicated by dashed lines in FIG. 5, which are, the R line the R2 line (the reactor 13)→the diode D7→the capacitor 23→the diode D2→the S1 line (the reactor 14)→the S line, and the R line→the R2 line (the reactor 13)→the diode D7→the capacitor 23→the diode D6→the S2 line (the reactor 15)→the S line, and the capacitor 23 is charged. The energy stored in the reactors 13, 14 and 15 is outputted to the capacitor 23 to boost the direct current voltage generated between the P-side electrode and the N-side electrode during this period.

FIG. 6-FIG. 9 are to explain the operations of the power supply circuit in the case where the alternating current voltage of the alternating current power supply 10 on the R line (the R1 line, the R2 line) is negative relative to that on the S line (the S1 line, the S2 line). In this case, while the second and fourth switching devices 17 and 19 alternate between ON and OFF and a current flows through one of them which is turned on, no current flows through the first switching device 16 or the third switching device 18 because they are reverse-biased.

<In the Case where the Second Switching Device 17 is Turned On>

Figure 6:
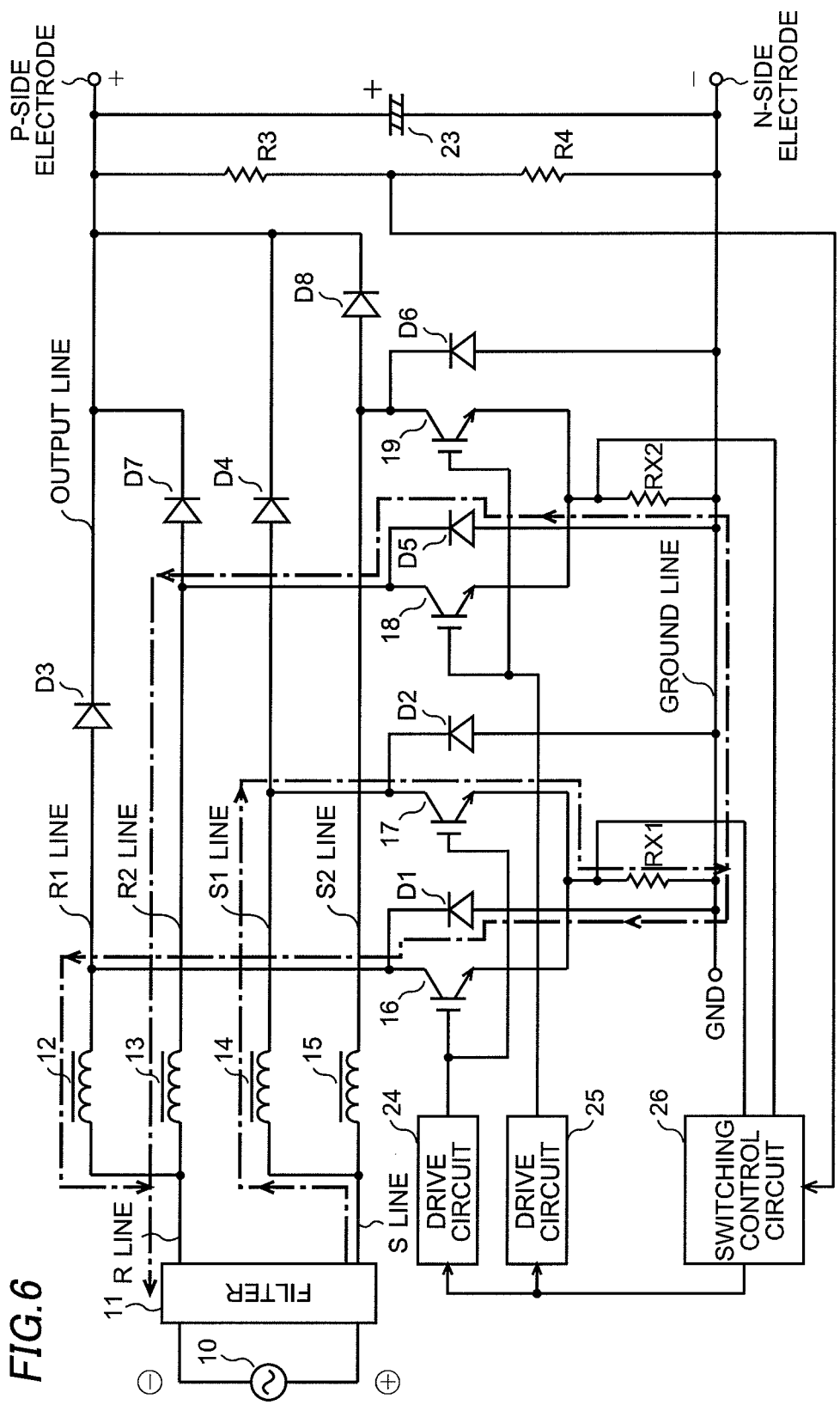
Figure 7:
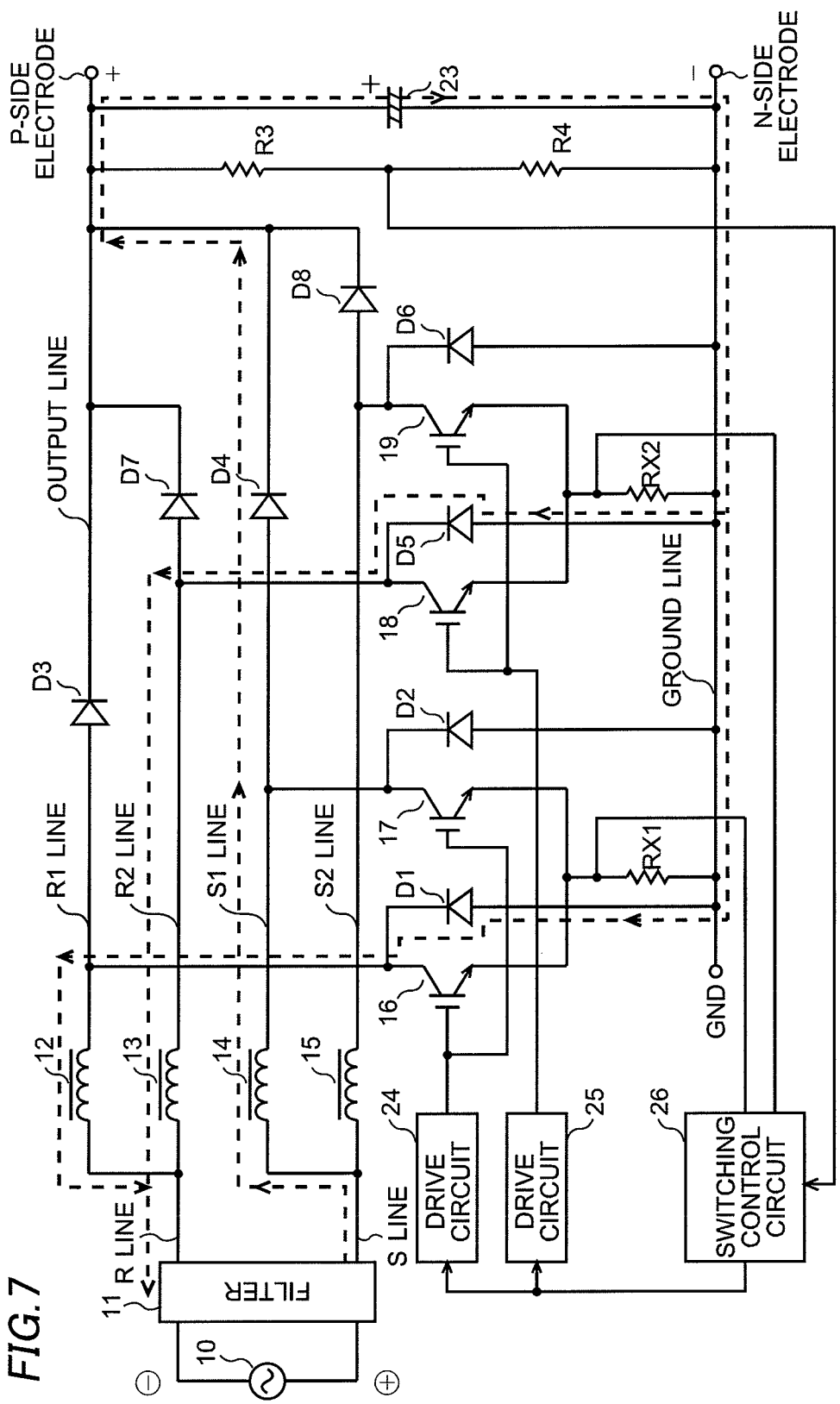
FIG. 7 is to explain operations of the power supply circuit in the case where the alternating current voltage on the R line is negative and the second switching device 17 is turned off.

In the case where the alternating current voltage on the R line is negative relative to that on the S line and the second switching device 17 is turned on, a current flows through two branch paths indicated by chain lines in FIG. 6, which are, the S line→the S1 line (the reactor 14)→the second switching device 17→the resistor RX1 the diode D1→the R1 line (the reactor 12)→the R line, and the S line→the S1 line (the reactor 14) the second switching device 17→the resistor RX1→the diode D5→the R2 line (the reactor 13)→the R line. In this case, the current returns to the alternating current power supply 10 through the R1 line and the R2 line. Energy is stored in the reactors 12, 13 and 14 during this period.

<In the Case where the Second Switching Device 17 is Turned Off>

In the case where the alternating current voltage on the R line is negative relative to that on the S line and the second switching device 17 is turned off, the reactors 12, 13 and 14 work to make a current flow in the same direction as in the case where the second switching device 17 is turned on. Therefore, the current flows through two branch paths indicated by dashed lines in FIG. 7, which are, the S line→the S1 line (the reactor 14)→the diode D4→the capacitor 23→the diode D1→the R1 line (the reactor 12)→the R line, and the S line→the S1 line (the reactor 14)→the diode D4→the capacitor 23→the diode D5→the R2 line (the reactor 13)→the R line, and the capacitor 23 is charged.

The energy stored in the reactors 12, 13 and 14 is outputted to the capacitor 23 to boost the direct current voltage generated between the P-side electrode and the N-side electrode during this period.

<In the Case where the Fourth Switching Device 19 is Turned On>

Figure 8:
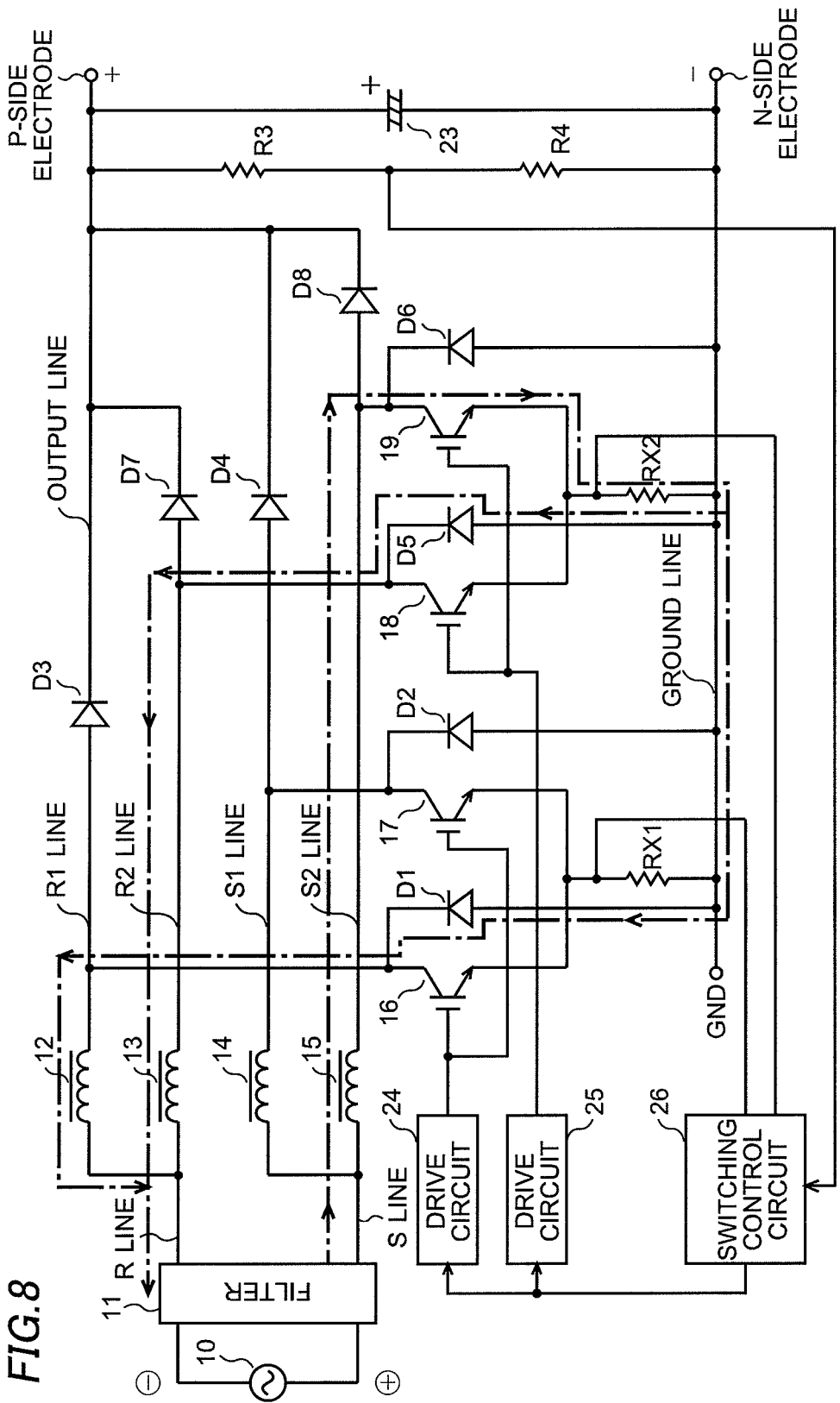
Figure 9:
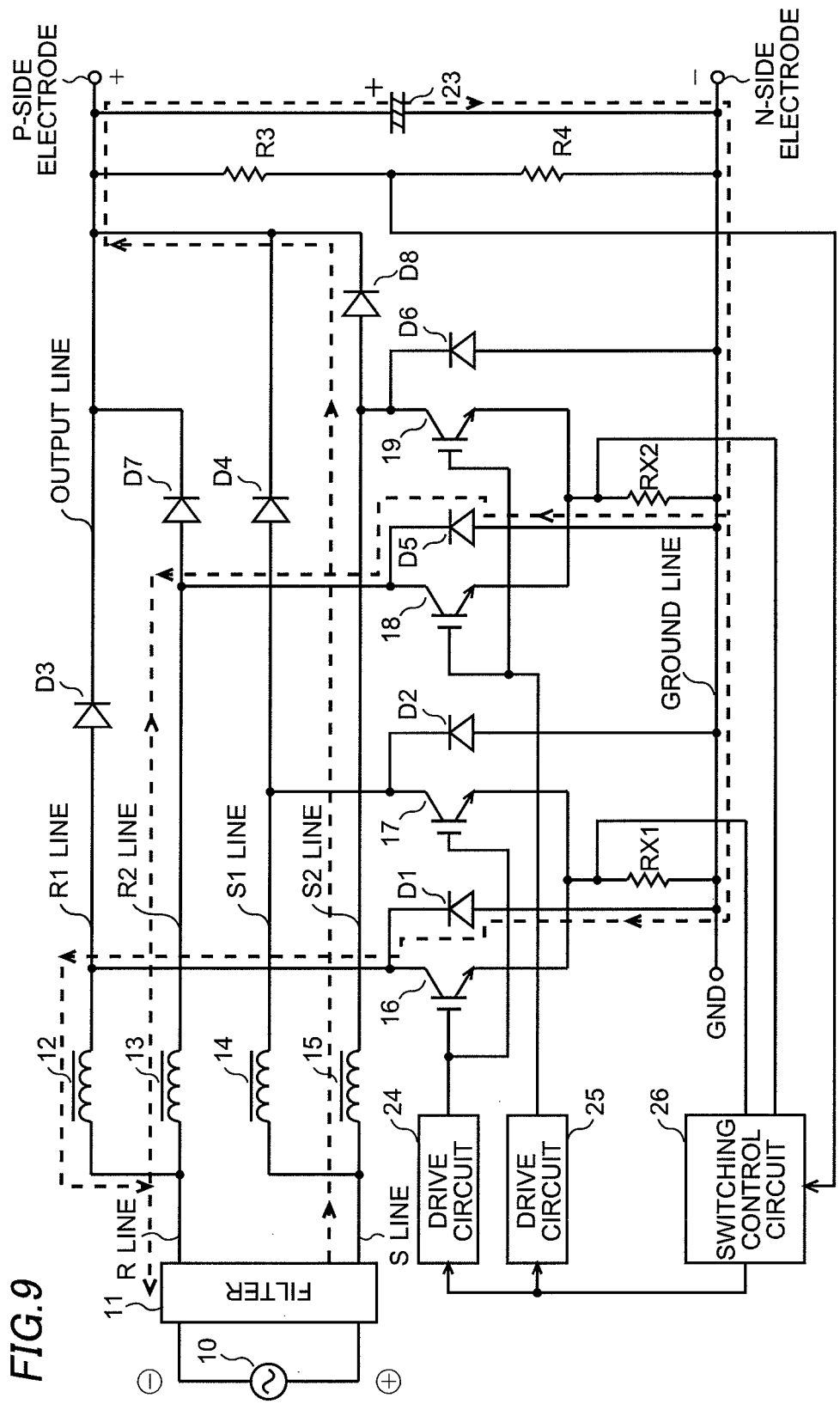
FIG. 9 is to explain operations of the power supply circuit in the case where the alternating current voltage on the R line is negative and the fourth switching device 19 is turned off.
Figure 10:
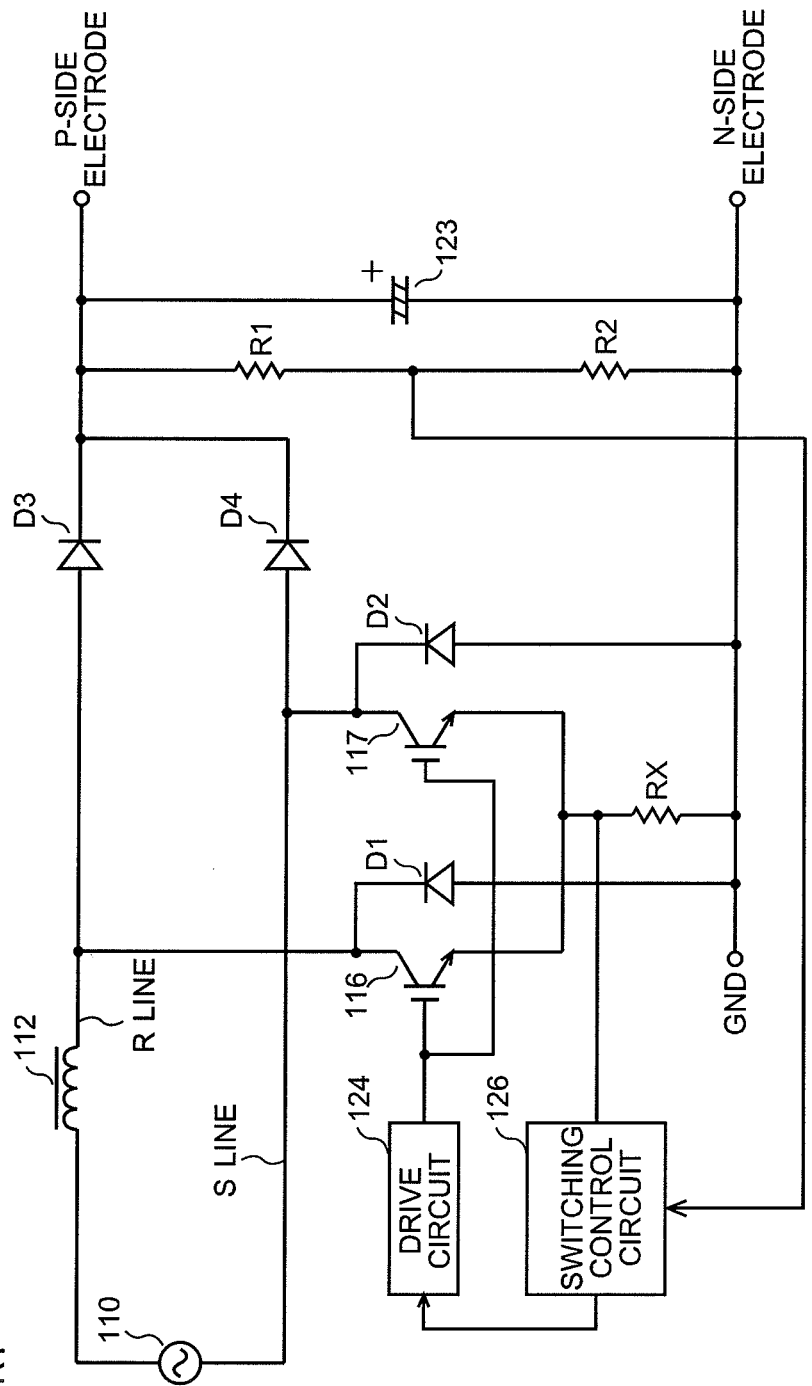
FIG. 10 is a circuit diagram of a conventional power supply circuit.
Figure 11:
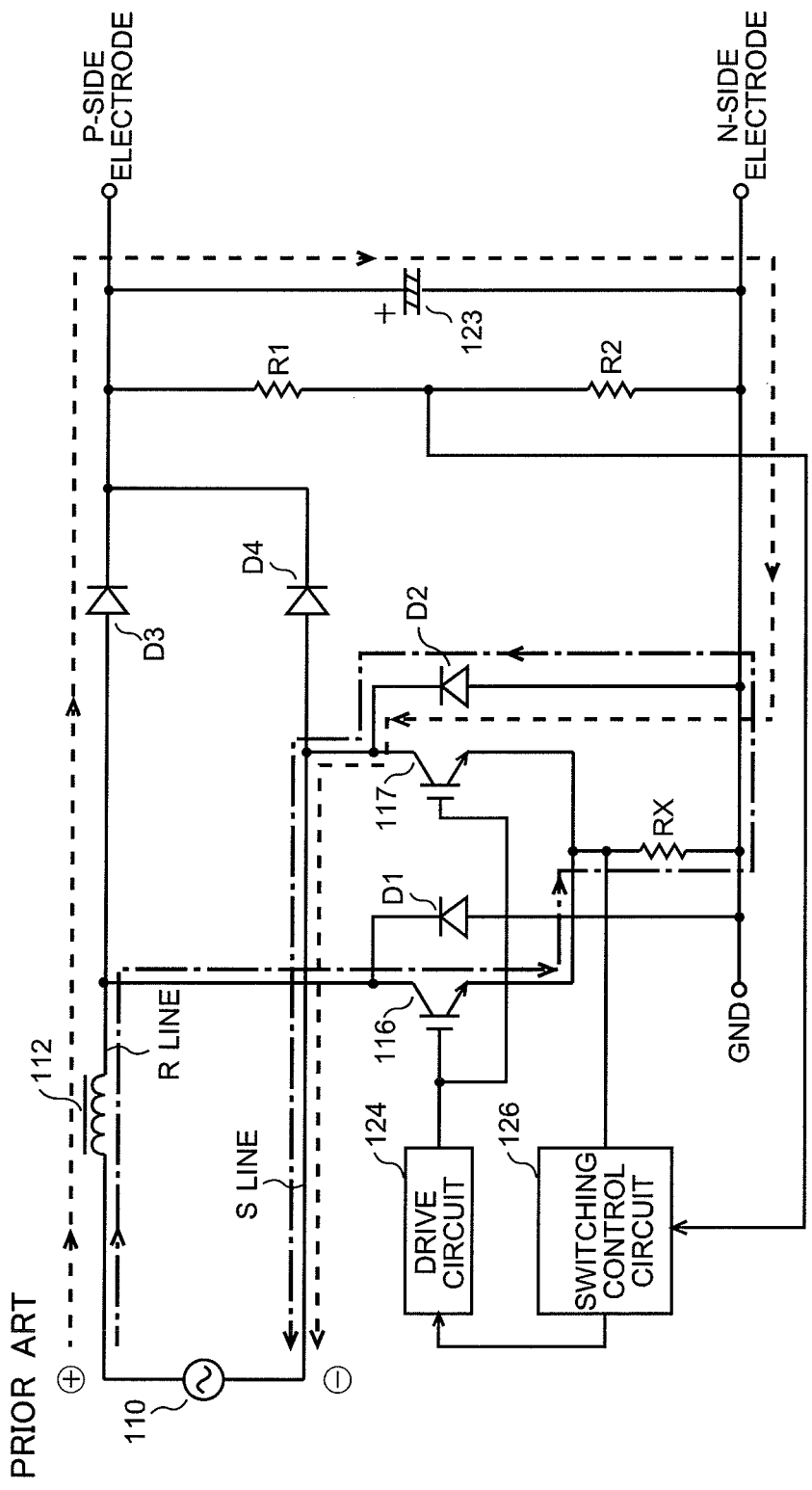
FIG. 11 is to explain operations of the conventional power supply circuit in the case where an alternating current voltage on an R line is positive.
Figure 12:
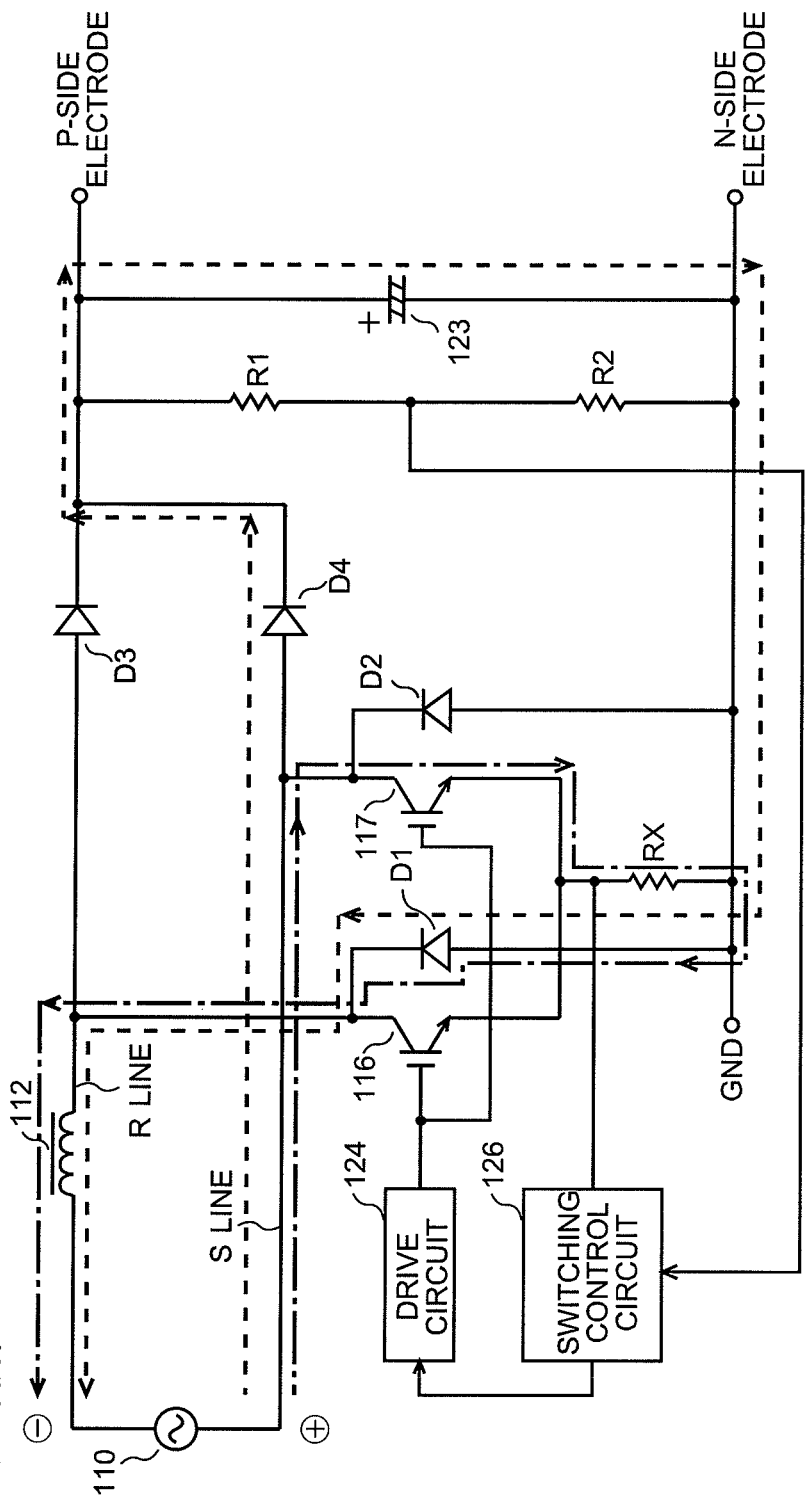
FIG. 12 is to explain operations of the conventional power supply circuit in the case where the alternating current voltage on the R line is negative.

In the case where the alternating current voltage on the R line is negative relative to that on the S line and the fourth switching device 19 is turned on, a current flows through two branch paths indicated by chain lines in FIG. 8, which are, the S line→the S2 line (the reactor 15)→the fourth switching device 19→the resistor RX2→the diode D1→the R1 line (the reactor 12)→the R line, and the S line→the S2 line (the reactor 15)→the fourth switching device 19 the resistor RX2 the diode D5→the R2 line (the reactor 13)→the R line. In this case, the current returns to the alternating current power supply 10 through the R1 line and the R2 line. Energy is stored in the reactors 12, 13 and 15 during this period.

<In the Case where the Fourth Switching Device 19 is Turned Off>

In the case where the alternating current voltage on the R line is negative relative to that on the S line and the fourth switching device 19 is turned off, the reactors 12, 13 and 15 work to make a current flow in the same direction as in the case where the fourth switching device 19 is turned on. Therefore, the current flows through two branch paths indicated by dashed lines in FIG. 9, which are, the S line→the S2 line (the reactor 15)→the diode D8→the capacitor 23→the diode D1→the R1 line (the reactor 12)→the R line, and the S line→the S2 line (the reactor 15)→the diode D8→the capacitor 23→the diode D5→the R2 line (the reactor 13)→the R line, and the capacitor 23 is charged.

The energy stored in the reactors 12, 13 and 15 is outputted to the capacitor 23 to boost the direct current voltage generated between the P-side electrode and the N-side electrode during this period.

While the first switching device 16 and the third switching device 18 alternate between ON and OFF when the alternating current voltage on the R line is positive relative to that on the S line as described above, the switching control circuit 26 controls the switching timings of the first and third switching devices 16 and 18 so that they turn on and off at timings different from each other.

That is, the switching control circuit 26 shifts the switching timings of the first switching device 16 and the third switching device 18 from the OFF state to the ON state as well as the timings of switching from the ON state to the OFF state so that they are switched to the ON state or to the OFF state at timings different from each other.

Also, while the second switching device 17 and the fourth switching device 19 alternate between ON and OFF when the alternating current voltage on the R line is negative relative to that on the S line, the switching control circuit 26 controls the switching timings of the second and fourth switching devices 17 and 19 so that they are switched on and off at timings different from each other. That is, the switching control circuit 26 shifts the switching timings of the second switching device 17 and the fourth switching device 19 from the OFF state to the ON state as well as the timings of switching from the ON state to the OFF state so that they are switched to the ON state or to the OFF state at timings different from each other.

As a result, the ripple current of the input/output of the power supply circuit due to the switching of the first through fourth switching devices 16, 17, 18 and 19 can be reduced. Also, in the case where the filter 11 is provided to remove the ripple current, a size of the filter 11 can be reduced because the ripple current itself is reduced.

Figure 13:
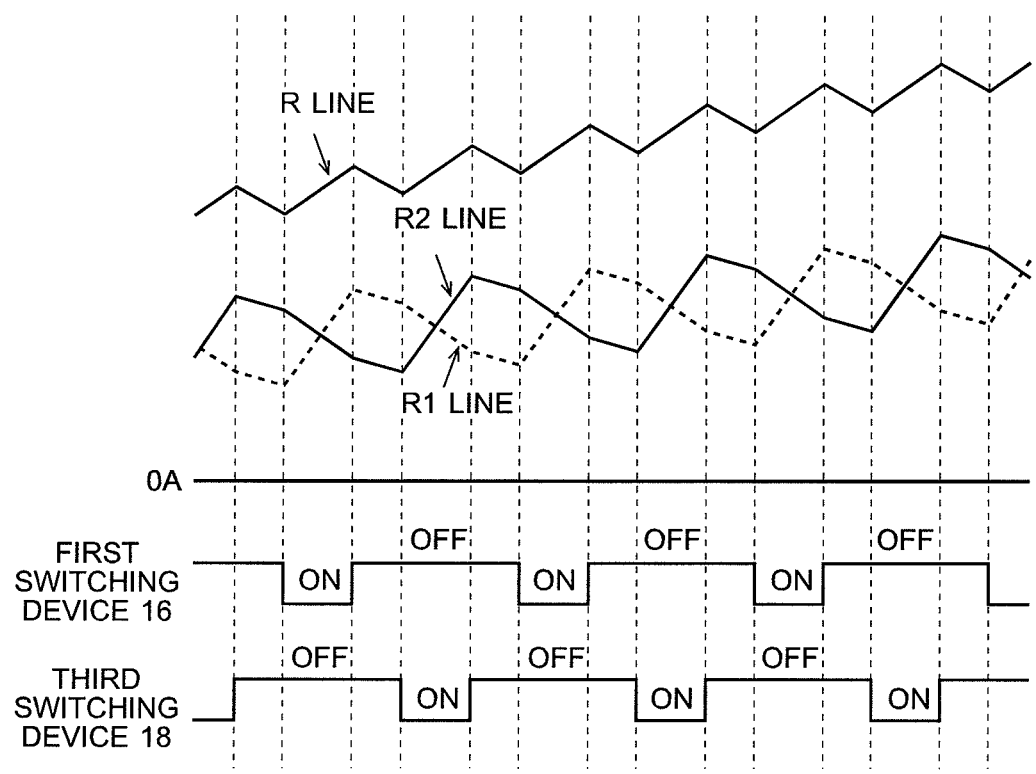
FIG. 13 is to explain switching timings of the first and third switching devices 16 and 18.

FIG. 13 is to explain the switching timings of the first and third switching devices 16 and 18, in the case where the alternating current voltage on the R line is positive relative to that on the S line. While the first and third switching devices 16 and 18 alternate between ON and OFF and have the same switching period (sum of an ON period and an OFF period), they are controlled so that both of them neither switch from the OFF state to the ON state simultaneously, nor switch from the ON state to the OFF state simultaneously. FIG. 13 also shows schematically a waveform of a current on the R1 line in relation to the switching of the first switching device 16, and a waveform of a current on the R2 line in relation to the switching of the third switching device 18.

Since the switching timings of the first and third switching devices 16 and 18 are controlled so as to differ from each other, phases of the waveforms of the currents on the R1 line and the R2 line also differ from each other. A waveform of a current on the R line, which is a composite of the waveform of the current on the R1 line and the waveform of the current on the R2 line, shows that the ripple currents due to the switching of the first and third switching devices 16 and 18 are reduced in the current on the R line. A horizontal line denoted by 0A in FIG. 13 represents a zero current line. In the case where the alternating current voltage on the R line is negative relative to that on the S line, the switching timings of the second and fourth switching devices 17 and 19 are the same as the switching timings of the first and third switching devices 16 and 18 shown in FIG. 13.

The returning current to the alternating current power supply 10 flows divided through the S1 line and S2 line in the case where the alternating current voltage on the R line is positive relative to that on the S line, and flows divided through the R1 line and the R2 line in the case where the alternating current voltage on the R line is negative relative to that on the S line. Therefore, the size of each of the reactors 12, 13, 14 and 15 can be reduced.

Also, the returning current to the alternating current power supply 10 flows divided through the diodes D2 and D6 in the case where the alternating current voltage on the R line is positive relative to that on the S line, and flows divided through the diodes D1 and D5 in the case where the alternating current voltage on the R line is negative relative to that on the S line. Therefore, the negative-side diodes D1, D2, D5 and D6 may be reduce in current capacity compared with the positive-side diodes D3, D4, D7 and D8 so that the cost is reduced.

Furthermore, improving the power factor of the power supply circuit, suppressing higher harmonic wave and regulating the direct current voltage can be made by controlling the timings to turn on and off the switching devices 16, 17, 18 and 19 based on the results of the current detection by the resistors RX1 and RX2 and the divided voltage signal of the output voltage.

Although the power supply circuit according to the embodiment of this invention is formed of two power supply circuits (voltage boosting converter circuits) connected in parallel and adopts the interleave method in which the switching devices constituting each of the power supply circuits are turned on and off at the timings different from each other, the power supply circuit may be formed of three or more than three power supply circuits (voltage boosting circuits) and structured so that switching devices constituting each of the power supply circuits are turned on and off at the timings different from each other.

According to the embodiment of this invention, it is made possible to reduce the ripple current of the input/output of the power supply circuit due to the switching of the switching devices as well as improving the power factor, since the power supply circuit is formed of two or more than two power supply circuits (voltage boosting circuits) and adopts the interleave method in which the switching devices constituting each of the power supply circuits are turned on and off at the timings different from each other. Also, the filter can be reduced in size, in the case where the filter to remove the ripple current is provided.

Also, according to the embodiment of this invention, the reactors can be reduced in size in the case where the reactors are connected to the alternating current input lines, since the alternating current input lines are provided to each of the power supply circuits and the circuit current flows through a plurality of the reactors so that the returning current to the power supply circuit flowing through each of the alternating current input lines is smaller than the returning current in the conventional power supply circuit.

What is claimed is:

1. A power supply circuit comprising:
   a positive-side output terminal;
   a negative-side output terminal;
   a first power supply circuit comprising first and second alternating current input lines between which an alternating current voltage is applied, a first bridge circuit comprising first, second, third and fourth rectifying devices each of which is connected to the first or second alternating current input line and generating an output voltage between the positive-side output terminal and the negative-side output terminal by full-wave rectifying the alternating current voltage, a first switching device connected in parallel with the first rectifying device that is connected with the negative-side output terminal, and a second switching device connected in parallel with the second rectifying device that is connected with the negative-side output terminal;
   a second power supply circuit comprising a third alternating current input line connected with the first alternating current input line, a fourth alternating current input line connected with the second alternating current input line, a second bridge circuit comprising fifth, sixth, seventh and eighth rectifying devices each of which is connected to the third or fourth alternating current input line and generating an output voltage between the positive-side output terminal and the negative-side output terminal, a third switching device connected in parallel with the fifth rectifying device that is connected with the negative-side output terminal and a fourth switching device connected in parallel with the sixth rectifying device that is connected with the negative-side output terminal; and a switching control circuit controlling switching timings of the first, second, third and fourth switching devices so that the first switching device and the third switching device are turned on and off at timings different from each other when the alternating current voltage on the first alternating current input line is positive relative to the alternating current voltage on the second alternating current input line and the second switching device and the fourth switching device are turned on and off at timings different from each other when the alternating current voltage on the first alternating current input line is negative relative to the alternating current voltage on the second alternating current input line.

2. The power supply circuit of claim 1, further comprising a first reactor connected to the first alternating current input line, a second reactor connected to the second alternating input line, a third reactor connected to the third alternating current input line and a fourth reactor connected to the fourth alternating current input line, wherein the alternating current voltage is applied to each of the first, second, third and fourth alternating current input lines through each of the first, second, third and fourth reactors, respectively.

3. The power supply circuit of claim 1, further comprising a filter to remove a ripple caused by the switching of the first, second, third or fourth switching device.

4. The power supply circuit of claim 1, further comprising a first current detection device to detect a current flowing through the first or second switching device and a second current detection device to detect a current flowing through the third or fourth switching device, wherein the switching control circuit controls switching of the first, second, third and fourth switching devices based on a result of detection by the first or second current detection device and a signal generated by dividing the output voltage.

* * * * *